United States Patent
Nanjyo et al.

(10) Patent No.: US 7,113,321 B2
(45) Date of Patent: Sep. 26, 2006

(54) OPTICAL DEFLECTION APPARATUS AND MANUFACTURING METHOD THEREOF, OPTICAL DEFLECTION ARRAY, IMAGING APPARATUS, AND IMAGE PROJECTION DISPLAY APPARATUS

(75) Inventors: Takeshi Nanjyo, Miyagi (JP); Seiichi Katoh, Miyagi (JP); Kouichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 10/822,816

(22) Filed: Apr. 13, 2004

(65) Prior Publication Data
US 2004/0263936 A1 Dec. 30, 2004

(30) Foreign Application Priority Data
Apr. 15, 2003 (JP) ............... 2003-110644

(51) Int. Cl.
G02B 26/00 (2006.01)
G02B 26/08 (2006.01)
G11C 13/02 (2006.01)
B23K 11/24 (2006.01)
H01J 43/00 (2006.01)

(52) U.S. Cl. .............. 359/290; 359/295; 359/298; 359/212; 359/214; 359/221; 359/877; 307/112; 307/400; 250/214 LA; 250/389; 340/815.65; 340/815.83; 324/109; 385/31

(58) Field of Classification Search ........ 359/290–295, 359/298, 212, 214, 221, 877; 307/112, 400; 324/109, 458; 340/815.65, 815.83; 250/274–276, 250/214 LA, 389, 591; 385/31, 25, 37, 146
See application file for complete search history.

(56) References Cited

U.S. PATENT DOCUMENTS

| | | | | |
|---|---|---|---|---|
| 2,695,363 A | * | 11/1954 | Marvin | 250/375 |
| 3,997,839 A | * | 12/1976 | Dreyfus et al. | 324/109 |
| 4,078,183 A | * | 3/1978 | Lewiner et al. | 307/112 |
| 4,176,345 A | * | 11/1979 | Micheron et al. | 340/815.65 |
| 4,194,189 A | * | 3/1980 | Lewiner et al. | 340/815.83 |
| 4,205,242 A | * | 5/1980 | Micheron et al. | 307/400 |
| 4,227,086 A | * | 10/1980 | Dreyfus et al. | 250/389 |
| 4,598,590 A | * | 7/1986 | Busch-Vishniac et al. | 73/724 |
| 4,818,857 A | * | 4/1989 | Micheron et al. | 250/214 LA |
| 5,017,987 A | | 5/1991 | Nanjoh et al. | |

(Continued)

FOREIGN PATENT DOCUMENTS
JP 5-2973 1/1993

(Continued)

OTHER PUBLICATIONS

K. E. Petersen, Applied Physics Letters, vol. 31, No. 8, pp. 521-523, "Micromechanical Light Modulator Array Fabricated on Silicon", Oct. 15, 1977.

(Continued)

Primary Examiner—Loha Ben
(74) Attorney, Agent, or Firm—Oblon, Spivak, McClelland, Maier & Neustadt, P.C.

(57) ABSTRACT

A miniaturized and highly integrated optical deflection apparatus is realized in which the number of electrodes for driving the optical deflection apparatus is reduced. The optical deflection apparatus implements a sheet member that is electrically floating and plural electrodes that are implemented on a substrate. The sheet member includes a member having a light reflection region and an electret member that is charged at a predetermined electric potential. The sheet member is tilted by applying an electric potential that is substantially equivalent to an electric potential of the electret member to one of the electrodes and applying a ground potential to another one of the electrodes.

24 Claims, 13 Drawing Sheets

U.S. PATENT DOCUMENTS

| | | | |
|---|---|---|---|
| 5,108,843 A | 4/1992 | Ohtaka et al. | |
| 5,304,357 A | 4/1994 | Sato et al. | |
| 5,408,113 A | 4/1995 | Kanno et al. | |
| 5,448,113 A | 9/1995 | Suzuki et al. | |
| 5,633,523 A | 5/1997 | Kato | |
| 5,668,413 A | 9/1997 | Nanjo | |
| 5,771,321 A * | 6/1998 | Stern | 385/31 |
| 5,811,353 A | 9/1998 | Nanjo | |
| 6,150,698 A | 11/2000 | Ohtsuka et al. | |
| 6,312,108 B1 | 11/2001 | Kato | |
| 6,324,149 B1 | 11/2001 | Mifune et al. | |
| 6,332,669 B1 | 12/2001 | Kato et al. | |
| 6,367,914 B1 | 4/2002 | Ohtaka et al. | |
| 6,450,618 B1 | 9/2002 | Kato et al. | |
| 6,467,881 B1 | 10/2002 | Katoh | |
| 6,483,056 B1 * | 11/2002 | Hyman et al. | 200/181 |
| 6,485,126 B1 | 11/2002 | Kato et al. | |
| 6,504,118 B1 * | 1/2003 | Hyman et al. | 200/181 |
| 6,636,368 B1 | 10/2003 | Ohtaka | |
| 6,710,949 B1 | 3/2004 | Ohtaka | |
| 2004/0263936 A1 | 12/2004 | Nanjyo et al. | |

FOREIGN PATENT DOCUMENTS

| | | |
|---|---|---|
| JP | 6-138403 | 5/1994 |
| JP | 8-84485 | 3/1996 |
| JP | 2941952 | 6/1999 |
| JP | 3016871 | 12/1999 |
| JP | 2000-2842 | 1/2000 |
| JP | 2002-131838 | 5/2002 |
| WO | WO 96/41224 | 12/1996 |
| WO | WO 96/41226 | 12/1996 |

OTHER PUBLICATIONS

O. Solgaard, et al., Optics Letters, vol. 17, No. 9, pp. 688-690, "Deformable Grating Optical Modulator", May 1, 1992.

L. J. Hornbeck, SPIE Critical Reviews Series, vol. 1150, pp. 86-102, "Deformable-Mirror Spatial Light Modulators", 1989.

P. F. Van Kessel, et al., Proceedings of the IEEE, vol. 86, No. 8, pp. 1687-1704, "A MEMS-Based Projection Display", Aug. 1998.

D. S. Dewald, Optical Engineering, vol. 39, No. 7, pp. 1802-1807, "Using Zemax Image Analysis and User-Defined Surfaces for Projection Lens Design and Evaluation for Digital Light Processing™ Projection Systems", Jul. 2000.

O. Butsuri, vol. 68, No. 3, pp. 285-289, "Digital Micro-Mirror Device", 1999 (introduces the concepts of reference AX).

U.S. Appl. No. 11/265,206, filed Nov. 3, 2005, Katoh et al.

* cited by examiner

B-B' CROSS-SECTION

A-A' CROSS-SECTION

C-C' CROSS-SECTION

A-A' CROSS-SECTION

C-C' CROSS-SECTION

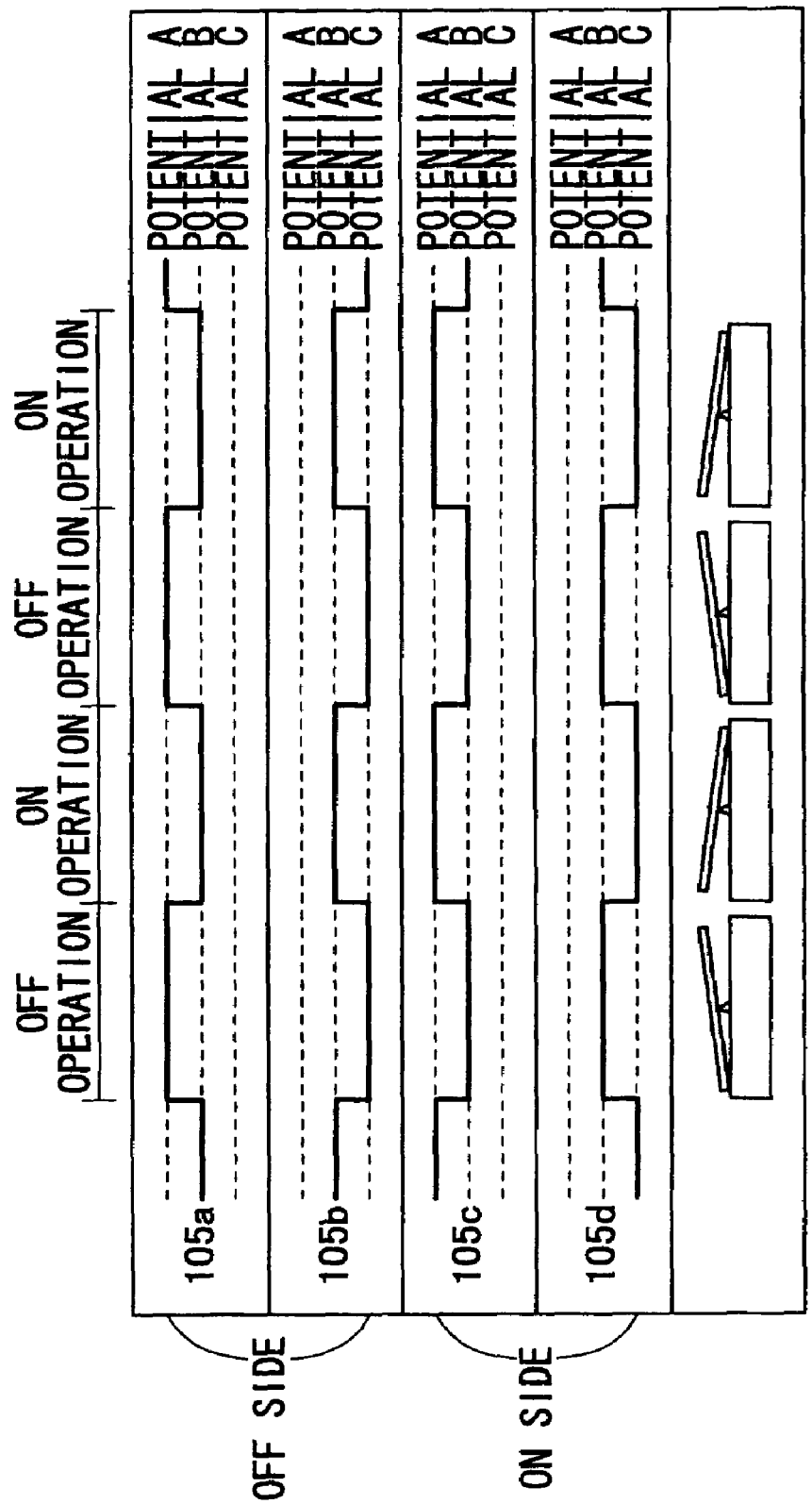

D-D' CROSS-SECTION

OFF OPERATION

ON OPERATION

OPTICAL DEFLECTION APPARATUS AND MANUFACTURING METHOD THEREOF, OPTICAL DEFLECTION ARRAY, IMAGING APPARATUS, AND IMAGE PROJECTION DISPLAY APPARATUS

BACKGROUND OF THE INVENTION

1. Field of the Invention

The present invention relates to an optical deflection apparatus that changes a direction of a reflected light with respect to an incident light, the technique being applicable to an electrophotographic imaging apparatus such as a printer or a copier, and an image/video projection display apparatus such as a projector or a digital theater system.

2. Description of the Related Art

In the prior art, an optical switch device using electrostatic power is disclosed by K. E. Petersen, the disclosure relating to a device that switches a reflection direction of light by causing a cantilever beam to bend using electrostatic power, and an optical deflection system implementing such a device (see Applied Physics Letters, Vol. 31, No. 8, 1977, pp. 521~523; Japanese Patent No. 2941952; Japanese Patent No. 3016871). Also, D. M. Bloom et al. discloses a device that realizes optical switching by driving a grating by electrostatic power (see Optics Letters, Vol. 7, No. 9, pp. 688~690).

In Japanese Patent Laid-Open Publication No. 6-138403, an imaging apparatus applying an optical deflection system is disclosed, the apparatus implementing digital micro-mirror devices (DMD) in one dimensional or two dimensional arrangements.

L. J. Hornbeck discloses a torsion beam type digital micro-mirror device and a cantilever beam type digital micro-mirror device as configurations of the digital micro-mirror device (see Proc. SPIE Vol. 1150, pp. 86~102, 1989). It is noted that in the torsion beam type digital micro-mirror device and the cantilever beam type digital micro-mirror device disclosed by L. J. Hornbeck, a tilted mirror unit is used, and the mirror unit used in this prior art example has at least one fixed end.

In Japanese Patent Laid-Open Publication No. 2000-2842, a device that realizes high speed optical deflection by deforming a dual-side fixed beam to bend into a cylindrical shape is disclosed.

An exemplary application of the optical switch device in a commodity product presently being manufactured is disclosed by L. J. Hornbeck in "A MEM-Based Projection Display", PROCEEDINGS OF THE IEEE, Vol. 86, No. 8, August 1998, pp 1687~1704. The disclosure pertains to a projection type image display apparatus in which plural torsion beam type optical switch devices are implemented in a two-dimensional arrangement, and an optical signal corresponding to image information of each pixel is guided to a projection lens to display an image. In this prior art example, one light source is used, and light generated at this light source passes through a rotating color wheel to be successively converted into R, G, B color light, after which the light is incident to a chip (optical switch devices arranged into an array) and reflected so that an optical signal corresponding to image information in RGB colors is successively guided to the projection lens to display an image. By using the above system, an image may be displayed using one light source and one chip, and a relatively low-priced projection type image display apparatus may be realized.

Also, another system for displaying an image in a projection type image display apparatus implementing the above described optical switch device is disclosed by L. J. Hornbeck et al. in "Using ZEMAX Image Analysis and User-Defined Surfaces for Projection Lens Design and Evaluation for Digital Light Processing TM Projection Systems", Optical Engineering, Vol. 39, No. 7, July 2000, pp. 1802~1807. In this prior art example, one light source is used, and light generated from this light source is passed through a TIR (Total Internal Reflection) PRISM, after which the light is passed through a COLOR PRISM that realizes color separation and color synthesis. Consequently, the light is separated into three color lights, which are incident to three chips. Then, the lights may be reflected in a desired direction, and may be passed through the COLOR PRISM once more for color synthesis. Then, the synthesized light as an optical signal may be guided to the projection lens to display an image. Although the projection type image display apparatus using this system is not inexpensive, R, G, B color signals may be simultaneously displayed, and thereby, the display time of each color in one frame may be maximized, and a high luminance projection type image display apparatus may be realized. It is noted that the above systems of the projection type image display apparatuses are also described in "Digital Micro-Mirror Device", Ohyo Butsuri, Vol. 68, No. 3, 1999, pp. 285~289.

In Japanese Patent Laid-Open Publication No. 2002-131838, a projection type image display apparatus implementing the optical switch disclosed by D. M. Bloom that drives a grating by electrostatic power is disclosed. A projection type image display apparatus according to this prior art example includes a laser light source and a space modulator that implements the optical switches in a one-dimensional arrangement, and is adapted to project an image on a screen by scanning, with a scan mirror, a light flux including color synthesized image components of one vertical or horizontal line. This projection type image display apparatus has to use a laser light source to realize the functions of the optical switch, and this inevitably raises the price of the apparatus.

In the cantilever type optical switch or digital micro-mirror device, it is difficult to secure stability of the beam, and the response speed is slow. In the torsion beam type digital micro-mirror device, the mechanical strength of a hinge portion (torsion beam) may be degraded upon long term use. In the optical switch device disclosed in Japanese Patent No. 2941952 and Japanese Patent No. 3016871, the wavelength of the incident light is restricted. As for the device disclosed in Japanese Laid-Open Patent No. 2000-2842, namely, a device in which a parallel space is provided between electrodes and where a dual side fixed beam is bent into a cylindrical shape by an electrostatic force generated between the electrodes, high speed deformation may be realized so that the response speed may be increased; however, since both sides of the beam are fixed, the drive voltage is high compared to the cantilever beam type or torsion beam type device.

FIGS. 1A and 1B are diagrams showing an exemplary configuration of an optical deflector according to the conventional art. FIG. 1A is a top view of the conventional optical deflector (showing a fulcrum member 103 and electrodes 105a~105d), and FIG. 1B is a cross-sectional view (cut across line B–B') of the conventional optical deflector.

In this conventional optical deflector, a member having a light reflection region is displaced by electrostatic attraction, and accordingly, a light flux that is incident to the light reflection region is deflected by changing its reflection direction. The optical deflection apparatus includes a substrate 101, plural regulating members 102, a fulcrum member 103, a sheet member 104, and plural electrodes 105a~105d. The plural regulating members 102 each have a stopper at their upper portion and are respectively placed at plural edges of the substrate 101. The fulcrum member 13 has a peak portion and is placed on the upper surface of the substrate 101.

The sheet member 104 does not have a fixed end, and includes a light reflection region on its upper surface, and a conductor layer made of an element that is at least partially conductive, the sheet member 104 being movably implemented within a space between the substrate 101, the fulcrum member 103, and the stoppers. The plural electrodes 105a~105d are implemented on the substrate 101 and are arranged substantially opposite to the conductor layer of the sheet member 104.

The conventional optical deflection apparatus has the following advantages.
(1) Since the tilt angle is determined by the contact between the fulcrum member, the substrate, and the sheet member, the deflection angle of the mirror may be stably and easily controlled.
(2) Since the film sheet member may be easily rotated around the fulcrum member by applying differing electric potentials to opposing electrodes, a high response speed may be obtained.
(3) Since the sheet member does not have fixed ends, it is not deformed into a twisted state, for example, so that long-term degradation may be reduced and the sheet member may be driven with a low voltage.
(4) Since a miniaturized and light-weight sheet member may be formed through a semiconductor process, the shock from collision with the stoppers may be reduced and long-term degradation may be reduced.
(5) By arbitrarily determining the configurations of the regulating members, the sheet member, and the light reflection region, the ON/OFF ratio of the reflection light (e.g., S/N ratio in an imaging apparatus, and contrast ratio in a video apparatus) may be improved.
(6) Since a semiconductor process and device may be used, miniaturization and integration may be realized at low cost.
(7) By implementing plural electrodes and a fulcrum member in the middle, light deflection in one axis and two axis directions are possible.

In the following, a drive method of the conventional optical deflection apparatus is described with reference to FIGS. 2A~2D and FIG. 3.

FIGS. 2A~2D illustrate how the sheet member of the optical deflection apparatus of FIG. 1 is driven and tilted. FIG. 2A is a cross-sectional view of the conventional optical deflection apparatus across line A–A' during OFF operation time. FIG. 2B is a cross-sectional view of the conventional optical deflection apparatus across line C–C' during OFF operation time. FIG. 2C is a cross-sectional view of the conventional optical deflection apparatus across line A–A' during ON operation time. FIG. 2D is a cross-sectional view of the conventional optical deflection apparatus across line C–C' during ON operation time.

In this example, optical deflection operation is conducted by switching the electric potential being applied to the electrodes 105a~105d. In FIGS. 2A and 2D, the electrostatic attraction forces generated by the electric potentials applied to the electrodes 105a~105d are represented by outline arrows.

FIG. 3 is a time chart showing the electric potentials being applied to the respective electrodes of the conventional optical deflection apparatus.

Referring to FIGS. 2A~2D and FIG. 3, the drive method of the conventional optical deflection apparatus and the tilting operation of the sheet member 104 (i.e., light deflection operation) are described below.

First, in an OFF operation, as is shown in FIG. 3, a high electric potential A is applied to electrode 105a, a low electric potential C is applied to electrode 105b, and an intermediate electric potential B is applied to electrode 105c and electrode 105d. In this way, the sheet member 104 that includes a conductor layer and is arranged to electrically float opposite to the electrodes 105 may have an electric potential equivalent to the intermediate electric potential B between the high electric potential A and the low electric potential C as can be easily reasoned from calculations of a simple closed circuit. Consequently, electrostatic attraction force is not generated at the ON side electrodes 105c and 105d, and the electrostatic attraction force is generated at the OFF side electrodes 105a and 105b, as is shown in FIG. 2A, so that the sheet member 104 tilts toward the OFF side. This operation may be implemented as an OFF operation in a sequence of optical deflection operations as well as a reset operation for initializing the optical deflection operation.

Then, in an ON operation in FIG. 3, the high electric potential A is applied to the electrode 105c, the low electric potential C is applied to the electrode 105d, and the intermediate electric potential B is applied to the electrodes 105a and 105b. In this way, the sheet member 104 that includes a conductor layer and is arranged to electrically float opposite to the electrodes 105 may have an electric potential equivalent to the intermediate electric potential B between the high electric potential A and the low electric potential C as can be easily reasoned from calculations of a simple closed circuit. Consequently, the electrostatic attraction force is not generated at the OFF side electrodes 105a and 105b, and the electrostatic attraction force is generated at the ON side electrodes 105c and 105d as is shown in FIG. 2D so that the sheet member 104 tilts toward the ON side.

In order to improve the integration of the optical deflection apparatus and prevent manufacturing cost increase, the size of the optical deflection apparatus itself is preferably reduced, and a large number of the optical deflection apparatuses are preferably implemented in an application. Thereby, an IC driving the electrode is preferably implemented on the same substrate as that of the optical deflection apparatus. Also, in order to improve the ON/OFF ratio of the reflection light of the optical deflection apparatus, the drive IC is preferably positioned directly below the optical deflection apparatus.

However, the conventional optical deflection apparatus described above includes at least four electrodes, and thereby, it is difficult to arrange ICs driving the four electrodes directly under the optical deflection apparatus when reducing the size of the optical deflection apparatus at the same time.

SUMMARY OF THE INVENTION

The present invention has been conceived in response to one or more problems of the related art, and it is an object of the present invention to provide an optical deflection apparatus, an optical deflection apparatus manufacturing method, an optical deflection array, an imaging apparatus, and an image projection display apparatus that realizes a reduction in the number of electrodes for driving the optical deflection apparatus, and miniaturization and high integration of the optical deflection apparatus.

According to an aspect of the present invention, an optical deflection apparatus that changes a reflection direction of an incident light flux is provided, the optical deflection apparatus including a member having a light reflection region that is displaced or deformed by an electrostatic attraction force, and an electret member that contributes to generating the electrostatic attraction force. Herein, the electret member is arranged to have an electric potential contributing to the generation of the electrostatic attraction force, and thereby, the number of electrodes may be reduced.

According to an embodiment of the present invention, the electret member may be arranged to be in contact with the member including the light reflection region; and an electric potential difference between an electric potential of the electret member and an electric potential applied to an electrode that is set apart and placed substantially opposite to the electret member may cause the electret member and the member including the light reflection region to be displaced or deformed. Herein, the electret member may also act as a member that is displaced or deformed, and thereby, costs arising from implementing the electret member may be reduced.

According to another embodiment of the present invention, the electret member and the member including the light reflection region may not be electrically connected to an external potential; namely, the members may be electrically floating. Herein, wiring for externally supplying the electric potential of the electret member and the member including the light reflection region may not have to be implemented on the substrate, and thereby, the light reflection region may take up a large portion of the substrate area, and the ON/OFF ratio of the reflected light may be improved.

According to another aspect of the present invention, an optical deflection apparatus that changes a reflection direction of an incident light flux is provided, the optical deflection apparatus including a substrate; a plurality of regulating members having stoppers and being implemented at a plurality of edge portions of the substrate; a fulcrum member being implemented on the substrate; a sheet member including an electret member and a light reflection region, and being movably accommodated within a space created by the substrate, the fulcrum member, and the stoppers; and a plurality of electrodes implemented on the substrate and arranged substantially opposite to the electret member, the sheet member being displaced or deformed by an electrostatic force that is generated with respect to the electret member and the electrodes. Herein, an optical deflection apparatus, which is capable of realizing easy and stable control of the mirror deflection angle, high speed response, a reduction in long-term degradation, a lower drive voltage, improved ON/OFF ratio (e.g., S/N ratio in an image apparatus, and contrast ratio in a video apparatus) for the reflected light, miniaturization and high integration at low cost, and a one-axis two-dimensional optical deflection or a two-axis three-dimensional optical deflection, may be driven with a fewer number of electrodes.

According to an embodiment of the present invention, the fulcrum member may be arranged to divide the substrate substantially in half; the electrodes may be arranged such that a first electrode is implemented on one side of the fulcrum member and a second electrode is implemented on the other side of the fulcrum member; and a one-axis two-dimensional optical deflection may be realized by tilting the sheet member around the fulcrum member. Herein, one-axis two-dimensional optical deflection may be realized by two electrodes, and thereby, the optical deflection apparatus may be miniaturized at low cost.

According to another embodiment of the present invention, a first electric potential that is substantially equivalent to an electric potential of the electret member may be applied to one of the first and second electrodes; a second electric potential may be applied to the other one of the first and second electrodes; and the sheet member may be tilted by switching between applying the first electric potential and the second electric potential to the first electrode and the second electrode.

According to another aspect of the present invention, an optical deflection apparatus manufacturing method is provided, the method including the steps of forming a fulcrum member on a substrate; forming a plurality of electrodes on the substrate; depositing and planarizing a first sacrificial layer over the electrodes; depositing an electret member on the first sacrificial layer; charging the electret member to a predetermined electric potential; depositing a member including a light reflection region on the electret member; patterning the electret member and the member including the light reflection region into a sheet member; depositing a second sacrificial layer on the sheet member; patterning the first sacrificial layer and the second sacrificial layer; patterning a plurality of regulating members having stoppers to a position where the first and second sacrificial layers are patterned; and removing the patterned first and second sacrificial layers through etching.

According to an embodiment of the present invention, an inorganic material may be used for the electret member so that a thin electret member with good thermal resistance may be realized.

According to a further embodiment of the present invention, a metal oxide film, a metal oxinitride film, or a metal nitride film may be used as the inorganic material so that an electret member having good compatibility with a semiconductor process (e.g., manufacturing process of a semiconductor device such as an IC) and suitable for high voltage charge may be realized.

According to a further embodiment of the present invention, a silicon oxide film may be used as the inorganic material so that the electret member as a component of a sheet member that is displaced or deformed in an optical deflection operation may be made of a relatively low stress material. Also, by using such a material, good etching selectivity with the sacrificial layers may be realized in a dry etching process, and a good process yield may be obtained in the optical deflection apparatus.

According to another embodiment of the present invention, a silicon oxinitride film may be used as the inorganic material so that the electret member as a component of a sheet member that is displaced or deformed in an optical deflection operation may be made of a rigid material. Also, by using such a material, good etching selectivity with the sacrificial layers may be realized in a wet etching process, and a good process yield may be obtained in the optical deflection apparatus.

According to another embodiment of the present invention, a silicon nitride film may be used as the inorganic material so that the electret member as a component of a sheet member that is displaced or deformed in an optical deflection operation may be made of a rigid material. Also, by using such a material, good etching selectivity with the sacrificial layers may be realized in a wet etching process, and a good process yield may be obtained in the optical deflection apparatus.

According to another aspect of the present invention, an optical deflection array that implements plural optical deflection apparatuses of the present invention in a one-dimensional or two-dimensional arrangement is provided so that a miniaturized and highly integrated optical deflection array may be realized. Also, in the case of combining the optical deflection apparatus with a drive IC, a miniaturized and highly integrated optical deflection array may be realized at low cost.

According to another aspect, an optical array of the present invention may be implemented as an optical write unit to realize a miniaturized and highly integrated optical write unit at low cost.

According to another aspect, an optical deflection array of the present invention may be implemented as a display unit to realize a miniaturized and highly integrated display unit at low cost.

BRIEF DESCRIPTION OF THE DRAWINGS

FIG. 3 is a time chart showing the electric potentials being applied to electrodes of the optical deflection apparatus of FIGS. 1A and 1B;

DESCRIPTION OF THE PREFERRED EMBODIMENTS

In the following, preferred embodiments of the present invention are described with reference to the accompanying drawings.

First, three types of optical switch devices (optical deflection apparatuses) to which the present invention may be applied are described.

Figure 1A:
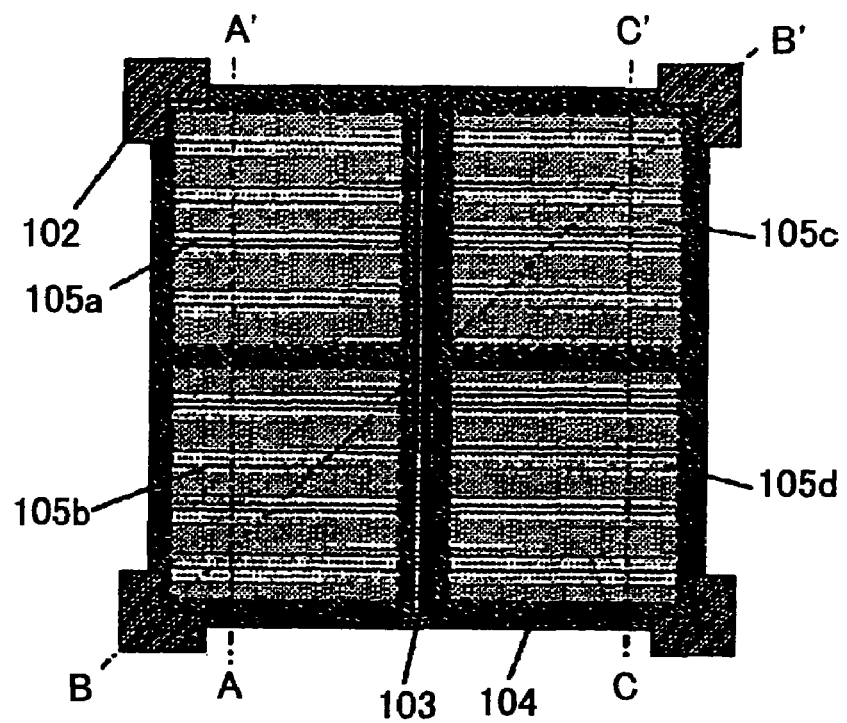
FIGS. 1A and 1B show a configuration of an optical deflection apparatus according to the prior art.
Figure 1B:
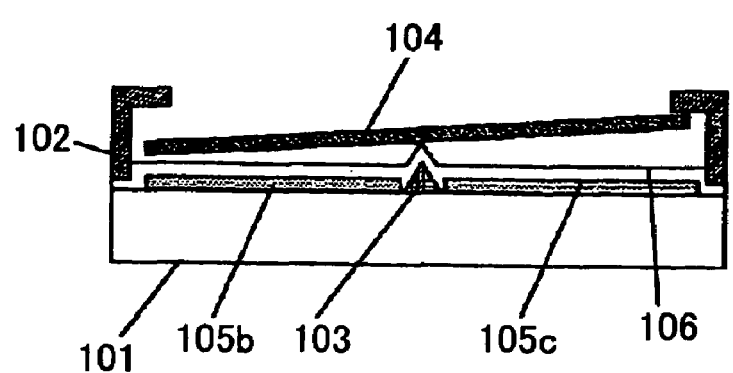
Figure 2A:
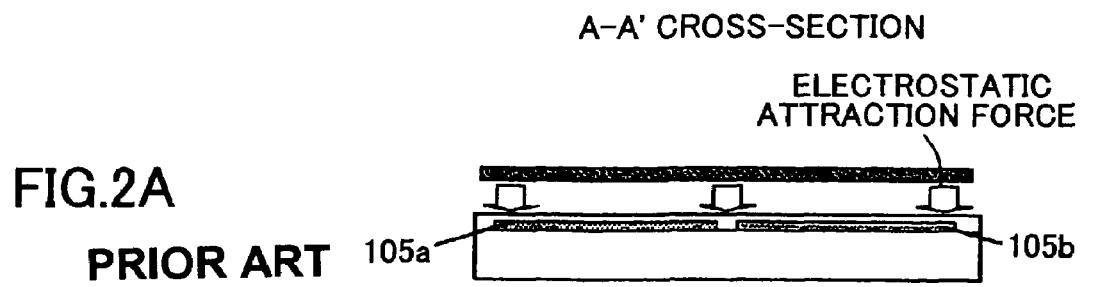
FIGS. 2A~2D are cross-sectional views showing how a sheet member of the optical deflection apparatus of FIGS. 1A and 1B tilts upon being driven.
Figure 2B:
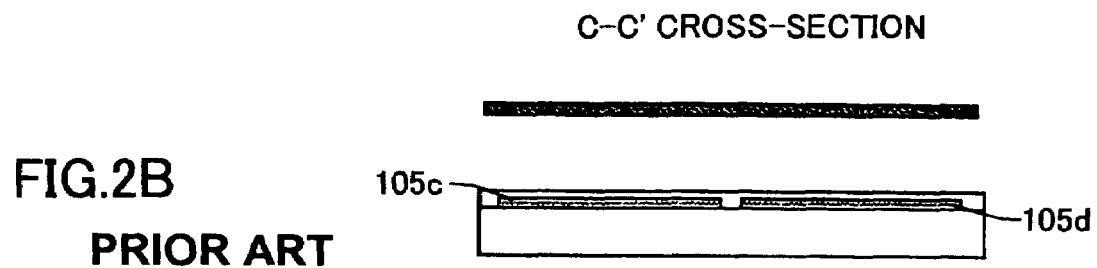
Figure 2C:
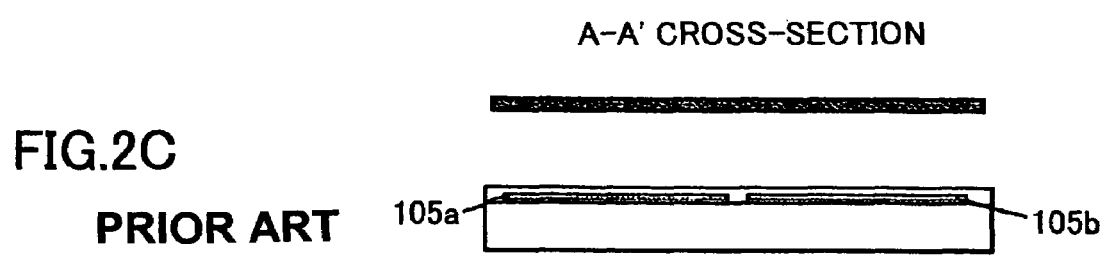
Figure 2D:
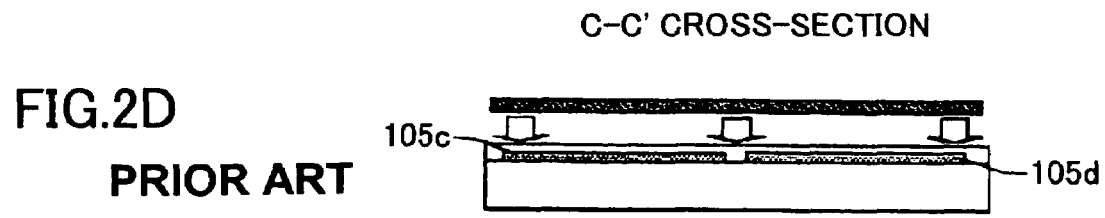
Figure 4A:
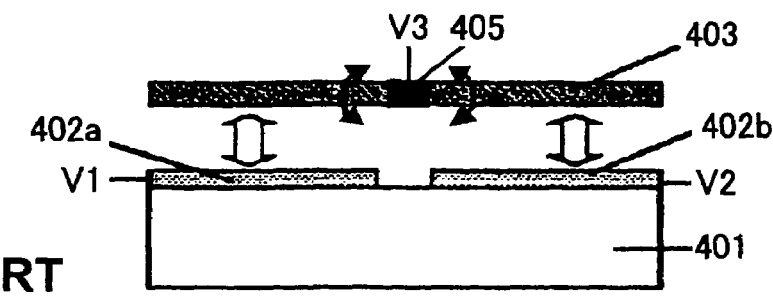
FIGS. 4A~4C are cross-sectional views of three different types of optical switch devices (optical deflection apparatuses) according to the prior art.
Figure 4B:
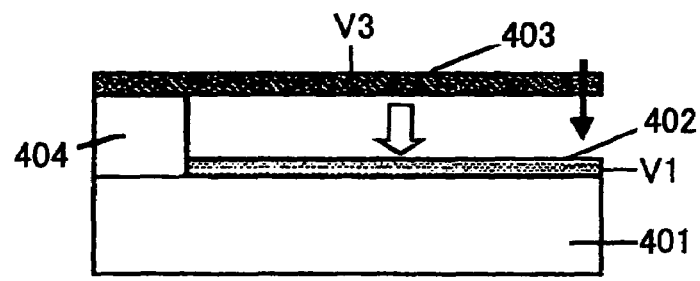

FIG. 4A shows a torsion beam type optical switch device (optical deflection apparatus); FIG. 4B shows a cantilever beam type optical switch device (optical deflection apparatus); and FIG. 4C shows a dual side fixed beam type optical switch device (optical deflection apparatus).

Figure 4C:
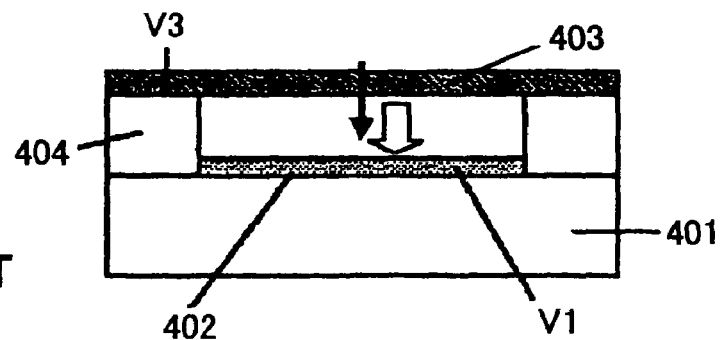

The optical switch devices (optical deflection apparatuses) of FIGS. 4A~4C each include a substrate 401, one or more electrodes 402 that are implemented on the substrate 401, and a member 403 having a light reflection region that may be displaced or deformed by an electrostatic attraction force. An electric potential is applied the electrode 402, thereby effecting generation the electrostatic attraction force. The member 403 is generally made of a metal film and corresponds to the other electrode to which an arbitrary electric potential is supplied. The torsion beam type optical switch device of FIG. 4A implements electrode 402a and electrode 402b as the electrode 402. The cantilever beam type optical switch device of FIG. 4B implements a support member 404 supporting the proximal end of the cantilever beam. The dual side fixed type optical switch device of FIG. 4C implements two support members 404 for fixing both sides of the member 403. The torsion beam type optical switch device implements a torsion hinge 405. It is noted that in FIGS. 4A~4C, the outline arrows represent the electrostatic attraction force.

In the following, operations of the above optical switch devices (optical deflection apparatuses) are described.

In the torsion beam type optical switch device (optical deflection apparatus) of FIG. 4A, the member 403 implementing the light reflection region is rotated around the torsion hinge 405 toward the electrode 402a side by an electrostatic attraction force generated by the electric potential difference between a potential V1 that is applied to the electrode 402a and a potential V3 that is applied to the member 403 implementing the light reflection region. Also, the member 403 implementing the light reflection region is rotated around the torsion hinge 405 toward the electrode 402b side by an electrostatic attraction force generated by the electric potential difference between a potential V2 that is applied to the electrode 402b and the potential V3 that is applied to the member 403 implementing the light reflection region. In such an arrangement, optical deflection may be conducted by changing the reflection direction of light incident to the light reflection region according to the rotational displacement of the member 403 implementing the light reflection region.

In the cantilever beam type optical switch device of FIG. 4B, the member 403 implementing the light reflection region is deformed and pulled toward the electrode 402 side by an electrostatic attraction force generated by an electric potential difference between a potential V1 that is applied to the electrode 402 and a potential V3 that is applied to the member 403 including the light reflection region. In such arrangement, optical deflection may be conducted by changing the reflection direction of light incident on the light reflection region according to the deformation of the member 403 including the light reflection region.

In the dual side fixed type optical switch device of FIG. 4C, the member 403 including the light reflection region is deformed and pulled toward the electrode 402 side by an electrostatic attraction force generated by an electric potential difference between a potential V1 that is applied to the electrode 402 and a potential V3 that is applied to the member 403 including the light reflection region. In such arrangement, optical deflection may be conducted by changing the reflection direction of light incident on the light reflection region according to the deformation of the member 403 including the light reflection region.

Figure 5A:
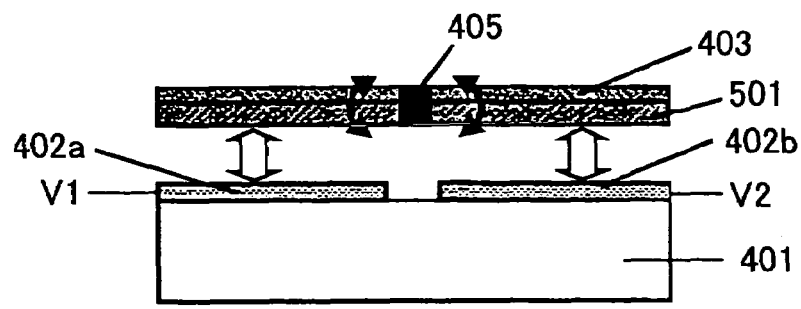
FIGS. 5A~5C are cross-sectional views of optical deflection apparatuses according to first through third embodiments of the present invention.
Figure 5B:
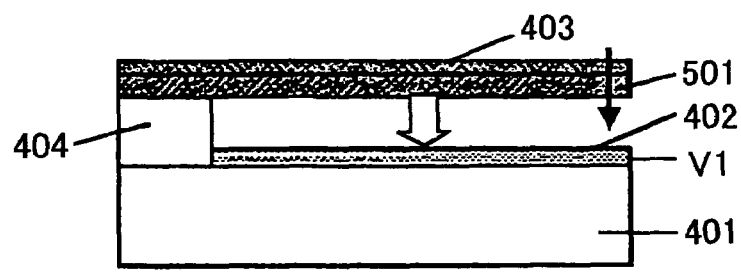
Figure 5C:
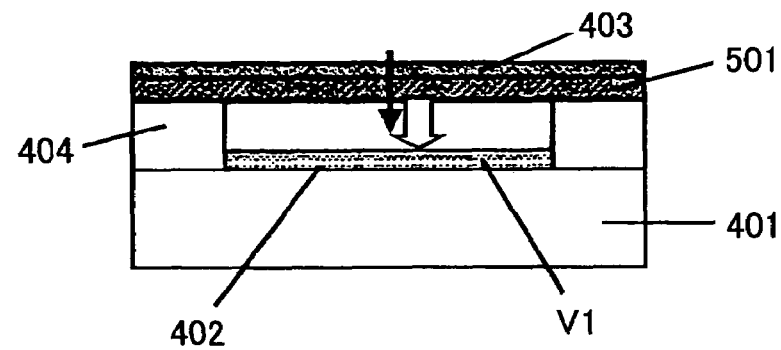

FIGS. 5A~5C illustrate configurations of optical deflection apparatuses according to embodiments of the present invention. FIG. 5A shows a torsion beam type optical switch device (optical deflection apparatus); FIG. 5B shows a cantilever beam type optical switch device (optical deflection apparatus); and FIG. 5C shows a dual side fixed type optical switch device (optical deflection apparatus). It is noted that in FIGS. 5A~5C, component parts that are identical to those shown in FIGS. 4A~4C are assigned the same numerical references, and the outline arrows represent electrostatic attraction forces.

The optical switch devices of FIGS. 5A~5C each include an electret member 501, which is a characteristic feature of the present embodiments. The electret member 501 is charged with an arbitrary electric potential other than a zero potential (ground potential), and is made of a material that is able to semi-permanently maintain this potential, the material generally being referred to as an electret. It is noted that exemplary devices using the electret in an electrostatic actuator and an electrostatic relay are cited in Japanese Patent Laid-Open Publication No. 8-84485 and Japanese Patent Laid-Open Publication No. 5-2973, for example.

In the following, a simple calculation method for obtaining a charge potential generated upon charging the electret member 501 is described, the calculation being based on representative dimensions and characteristic values of the optical switch device.

As methods of charging the electret member 501, for example, a thermal electret method, an electronic beam method, or a corona discharge method may be used, and a surface charge intensity $\sigma$ of the electret member 501 charged using a designated charge method is arranged to be $\sigma = 1.75 \times 10^{-3} \, C \cdot m^{-2}$. The electret member 501 may include, for example, a silicon oxide film with a specific inductive capacity $\in = 3.9$ and a thickness $t = 0.2 \, \mu m$.

A charge potential V0 of the electret member 501 may be calculated from the formula shown below.

$$V0 = \sigma \cdot t / (\in 0 \cdot \in)$$

It is noted that $\in 0$ represents an electric constant $(8.85 \times 10^{-12} \, C \cdot V^{-1} \cdot m^{-1})$, and the charge potential V0 may be around 10 V.

(Embodiment 1)

FIG. 5A shows the configuration of a torsion beam type optical deflection apparatus according to a first embodiment of the present invention. In the first embodiment, the electret member 501 that is charged with a predetermined potential is arranged to be in contact with the member 403 including the light reflection region, and the electret member 501 is arranged opposite to the electrodes 402a and 402b with a space provided therebetween. The electret member 501 and the member 403 including the light reflection region are not electrically connected to an external electric potential, that is, the electret member 501 and the member 403 including the light reflection region are arranged to float electrically.

In the operation of the optical deflection apparatus of the first embodiment, when a potential V1 is applied to the electrode 402a, the member 403 including the light reflection region and the electret member 501 is rotated around the torsion hinge 405 toward the electrode 402a side by an electrostatic attraction force generated by the electric potential difference between the potential V1 applied to the electrode 402a and the potential charged to the electret member 501.

Also, when a potential V2 is applied to the electrode 402b, the member 403 including the light reflection region and the electret member 501 is rotated around the torsion hinge 405 toward the electrode 402b side by an electrostatic attraction force generated by the electric potential difference between the potential V2 applied to the electrode 402b and the potential charged to the electret member 501. Thus, optical deflection may be realized by changing the reflection direction of light incident to the light reflection region according to the rotational displacement of the member 403 including the light reflection region and the electret member 501.

(Embodiment 2)

FIG. 5B shows the configuration of a cantilever beam type optical deflection apparatus according to a second embodiment of the present invention. In the second embodiment, as in the first embodiment, the electret member 501 that is charged with a predetermined potential is arranged to be in contact with the member 403 including the light reflection region, and the electret member 501 is arranged opposite to the electrode 402 with a space provided therebetween. The electret member 501 and the member 403 including the light reflection region are not electrically connected to an external electric potential, and are arranged to electrically float.

In the operation of the optical deflection apparatus of the second embodiment, when a potential V1 is applied to the electrode 402, the member 403 including the light reflection region and the electret member 501 is deformed and pulled toward the electrode 402 side by an electrostatic attraction force generated by the electric potential difference between the potential V1 applied to the electrode 402 and the potential charged to the electret member 501. Thus, optical deflection may be realized by changing the reflection direction of light incident on the light reflection region according to the deformation of the member 403 including the light reflection region and the electret member 501.

(Embodiment 3)

FIG. 5C shows the configuration of a dual side fixed type optical deflection apparatus according to a third embodiment of the present invention. In the third embodiment, as in the first embodiment, the electret member 501 that is charged with a predetermined potential is arranged to be in contact with the member 403 including the light reflection region, and the electret member 501 is arranged opposite to the electrode 402 with a space provided therebetween. The electret member 501 and the member 403 including the light reflection region are not electrically connected to an external electric potential, and are arranged to electrically float.

In the operation of the optical deflection apparatus of the third embodiment, when a potential V1 is applied to the electrode 402, the member 403 including the light reflection region and the electret member 501 is deformed and pulled toward the electrode 402 side by an electrostatic attraction force generated by the electric potential difference between the potential V1 applied to the electrode 402 and the potential charged to the electret member 501. Thus, optical deflection may be realized by changing the reflection direction of light incident on the light reflection region according to the deformation of the member 403 including the light reflection region and the electret member 501.

According to the above described configurations, the number of electrodes may be reduced. Also, since the electret member 501 functions as a member contributing to the generation of the electrostatic attraction force as well as a member that may be deformed/displaced, an increase in the manufacturing cost of the device may be avoided. Additionally, since wiring for supplying an electric potential to the electret member and the member including the light reflection region from the exterior does not have to be implemented on the substrate, the light reflection region may, if desired, take up a large proportion of the area of the substrate, and the ON/OFF ratio of the reflection light may be improved.

(Embodiment 4)

Figure 6A:
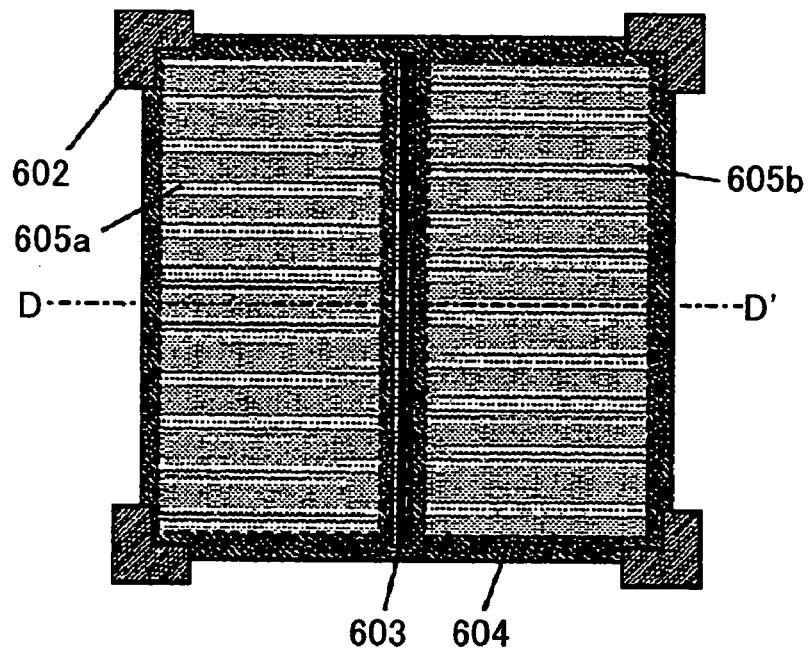
FIGS. 6A and 6B are diagrams showing a configuration of an optical deflection apparatus according to a fourth embodiment of the present invention.
Figure 6B:
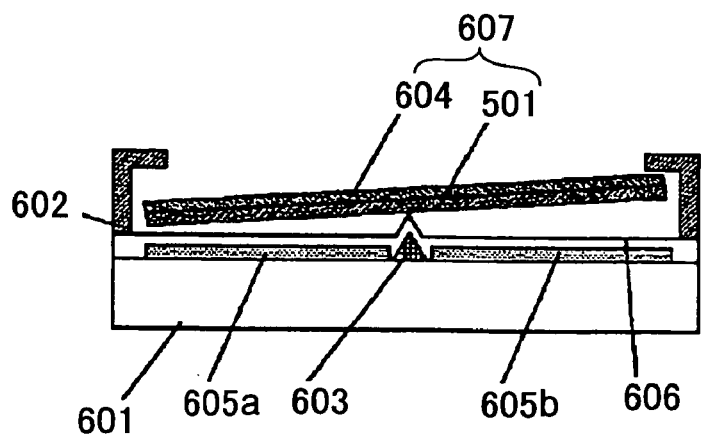

FIGS. 6A and 6B illustrate an optical deflection apparatus according to a fourth embodiment of the present invention. FIG. 6A is a top view of an optical deflection apparatus of the fourth embodiment (showing a fulcrum member 603, electrodes 605a and 605b), and FIG. 6B is a cross-sectional view of the optical deflection apparatus of the fourth embodiment (cut across line D–D')

The optical deflection apparatus of FIGS. 6A and 6B includes a substrate 601, plural regulating members 602 each having a stopper at their upper portion, a fulcrum member 603, electrodes 605a and 605b, an insulating film 606, and a sheet member 607.

The substrate 601 may be of any type; for example, a substrate used in a semiconductor process or a liquid crystal process such as a silicon substrate or a glass substrate may be used in order to realize miniaturization of the device. In the present embodiment, a silicon substrate with a (100) orientation is preferably used, taking into consideration the case of forming a drive circuit on the same circuit for cost reduction purposes.

The regulating member 602 having a stopper at its upper portion is formed into a canopy structure to confine the range of movement of the sheet member 607 to within an arbitrary space. The regulating member 602 with the stopper at its upper portion is preferably made of a thin film taking up relatively little space and having relatively high mechanical strength in order to increase the area of the light reflection regions when they are arrayed. Further, the thin film may preferably be a silicon oxide film, which has transparency with respect to the reflection light from the sheet member 607 positioned under the stoppers.

The fulcrum member 603 acts as a fulcrum upon moving the sheet member 607, and has a ridge-shaped structure that is arranged to be in substantial line contact with the sheet member 607. By arranging the fulcrum member 603 to have the above configuration, the mechanical strength of the fulcrum member 603 on the substrate 601 side may be increased, and the movement of the sheet member 607 may be regulated by a contact portion on the upper surface of the substrate 601 that comes into contact with the edge portion of the sheet member 607 so that the sheet member 607 does not come into contact with the slanting surface of the fulcrum member 603, and thereby the contact area of the sheet member 607 and the substrate 601 may be reduced and bonding and contact electrification of the sheet member 607 to the substrate 601 may be avoided. Also, since the fulcrum member 603 and the sheet member 607 come into contact by a line, the tilt angle and direction of the sheet member 607 may be regulated by a contact with the fulcrum member 603 and a contact with the substrate 601. As for the material of the fulcrum member, taking into consideration factors such as mechanical strength, a silicon oxide film or a silicon nitride film are preferably used. The sheet member 607 includes a light reflection region 604, and an electret member 501. The sheet member 607 is preferably arranged to be flat at least at the light reflection region 604, and as for the material of the light reflection region, metal with good reflectivity such as aluminum and its alloys, or titanium and its alloys are preferably used. Since metal films have high conductivity, the displacement of the sheet member 607 may be realized with a low voltage. The material of the electret member 501, which is a characteristic feature of the present embodiment is described later.

The electrodes 605a and 605b are formed on the substrate 601, and by applying differing electric potentials on the electrodes 605a and 605b, an electric field distribution is generated between the applied potentials and the charge potential of the electret member 501 of the sheet member 607 that is electrically floating, and by the electrostatic attraction force generated therefrom, the sheet member 607 may be tilted in an arbitrary direction so as to realize an optical deflection operation. The electrodes 605a and 605b may be made of a metal film such as a titanium nitride film, a chromium film, an aluminum film, or an alloy film of such metals, for example. The electrodes 605a and 605b may also be made of a silicon substrate to which boron, arsenic, or phosphorous are implanted in order to lower resistance. In order to maintain insulation between the sheet member 607, an insulating film 606 is formed over the electrodes 605a and 605b. A silicon oxide film or a silicon nitride film may preferably be used as the insulating film 606 from the perspective of compatibility with the semiconductor process; however, the insulating film 606 is not limited to these materials.

In the following, the operation of the optical deflection apparatus of the present embodiment is described.

Figure 7A:
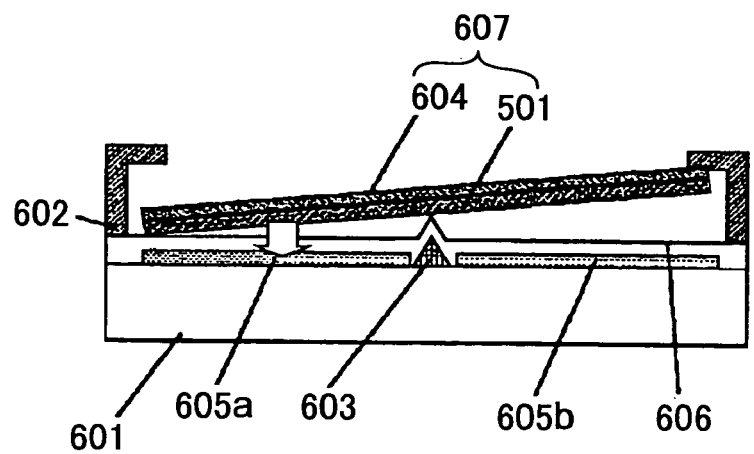
FIGS. 7A and 7B are cross-sectional views showing how the optical deflection apparatus of the fourth embodiment tilts upon being driven.
Figure 7B:
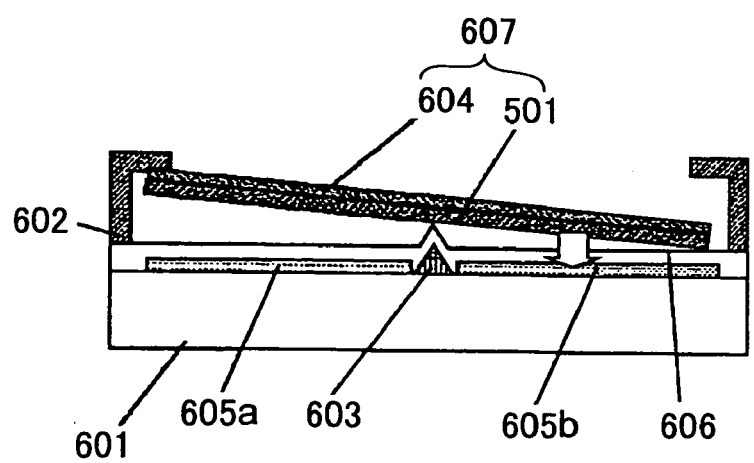

FIGS. 7A and 7B show tilted states of the optical deflection apparatus of FIGS. 6A and 6B. FIG. 7A is a cross-sectional view of the optical deflection apparatus cut across line D–D' during an OFF operation. FIG. 7B is a cross-sectional view of the optical deflection apparatus cut across line D–D' during an ON operation. In the present embodiment, the optical deflection operation is conducted by switching the electric potentials being applied to the electrodes 605a and 605b. In FIGS. 7A and 7B, electrostatic attraction forces generated by the electric potentials applied to the electrodes 605a and 605b are indicated by outline arrows.

Figure 8:
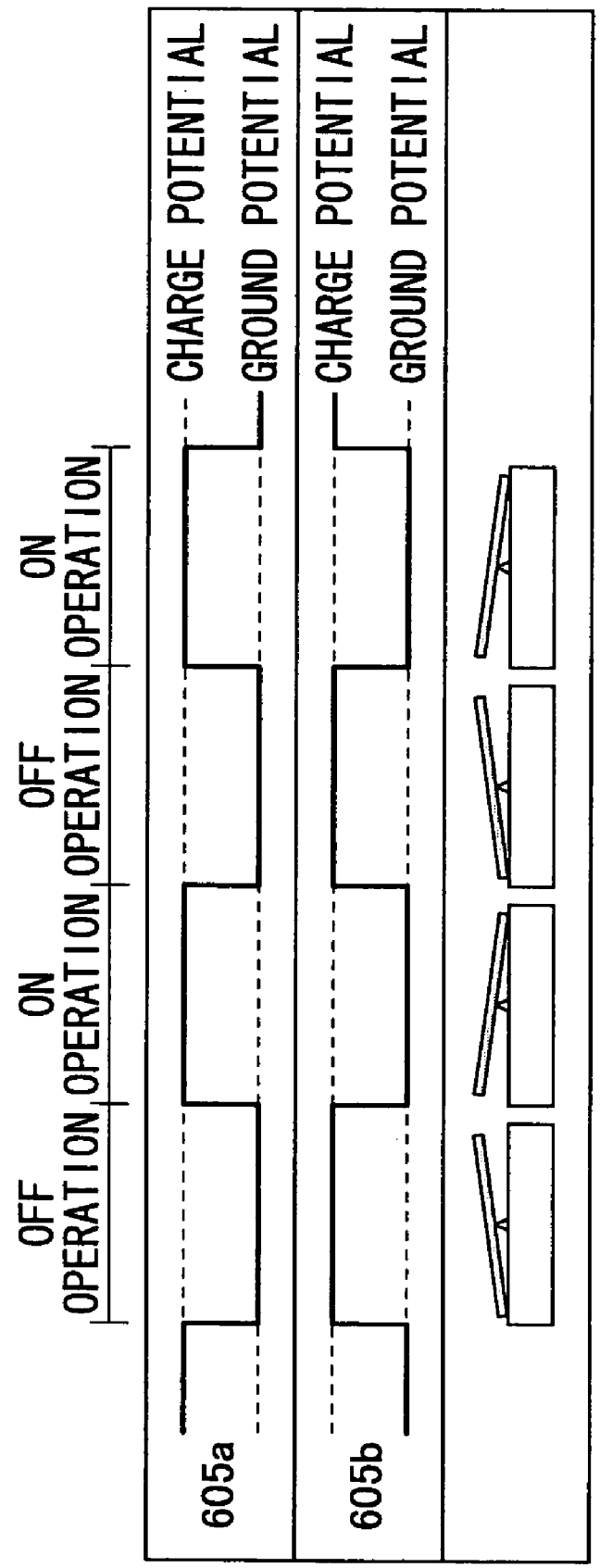
FIG. 8 is a time chart showing the electric potentials being applied to electrodes of the optical deflection apparatus of the fourth embodiment.

FIG. 8 is a time chart showing the electric potentials being applied to the electrodes 605a and 605b. Referring to this drawing, a method of driving the optical deflection apparatus of the present embodiment and a corresponding tilting operation of the sheet member 607 (i.e., optical deflection operation) are described below.

First, in an OFF operation, as is shown in FIG. 8, a ground potential is applied to the electrode 605a, and a potential substantially equivalent to the potential with which the electret member 501 is charged is applied to the electrode 605b.

The sheet member 607 that is arranged to electrically float opposite to the electrodes 605a and 605b (collectively referred to as electrodes 605) has an electric potential equivalent to the charge potential of the electret member 501, and thereby, an electrostatic attraction force is generated at the electrode 605a side owing to the electric potential difference with respect to the sheet member 607. The electrostatic attraction force is not generated at the electrode 605b side since the potential thereof is substantially equal to the potential of the sheet member 607, and an electrostatic repulsion force is activated. Accordingly, the sheet member 607 tilts toward the OFF side. This operation may be implemented as an OFF operation in a sequence of optical deflection operations as well as a reset operation conducted at an initial stage of an optical deflection operation.

In an ON operation according to FIG. 8, the charge potential is applied to the electrode 605a and the ground potential is applied to the electrode 605b. The sheet member 607 that is arranged to electrically float opposite to the electrodes 605 has an electric potential equivalent to the charge potential of the electret member 501. Thereby, an electrostatic attraction force is not generated at the electrode 605a side having an electric potential substantially equivalent to that of the sheet member 607, and the electrostatic repulsion force is activated. An electrostatic attraction force is generated at the electrode 605b side owing to its electric potential difference with the sheet member 607. Accordingly, the sheet member 607 tilts toward the ON side. In such case, light incident on an arbitrary point on the sheet member 607 changes its reflection direction, and the reflected light may be projected to a designated position (not shown), for example, this corresponding to the ON operation. In the case of the OFF operation described above, the reflected light is not projected to the designated position. In this way, by tilting the sheet member 607 a one axis two-dimensional optical deflection may be realized. It is noted that in the above description of FIG. 8, the duty ratio is set to 50%; however, this is merely an illustrative example, and the duty ratio may change depending on various applications (the same also applies to the case of FIG. 3).

(Embodiment 5)

In the following, a method of manufacturing the optical deflection apparatus according to an embodiment of the present invention is described. FIGS. 9A~9I are sectional views of the optical deflection apparatus of FIGS. 6A and 6B cut across the D–D' line, the views illustrating various processing stages in the manufacturing process of the optical deflection apparatus.

Figure 9A:
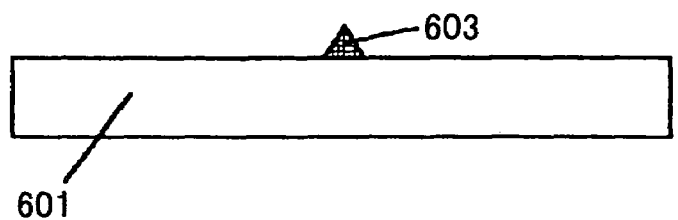
FIGS. 9A~9I illustrate a method of manufacturing an optical deflection apparatus according to a fifth embodiment of the present invention.

In FIG. 9A, the fulcrum member 603 is formed on the silicon substrate 601 by depositing a silicon oxide film through a plasma CVD process; then forming a resist pattern having an arbitrary film thickness into a shape that is substantially identical to that of the fulcrum member 603 through a photomechanical process using a photo mask having density gradation, or a photomechanical process of forming a resist pattern and thermally deforming the resist pattern thereafter; and then forming the fulcrum member 603 into a desired shape through dry etching. It is noted that the above process of forming the fulcrum member 603 may be conducted on an upper layer portion of the silicon oxide film that is formed on the silicon substrate 601.

Figure 9B:

In FIG. 9B, the electrodes 605a and 605b are formed by a thin titanium nitride (TiN) film. The TiN film is formed by conducting a DC magnetron sputtering process using Ti as a target, and pattering the electrodes 605a and 605b through photomechanical processing and dry etching.

Figure 9C:
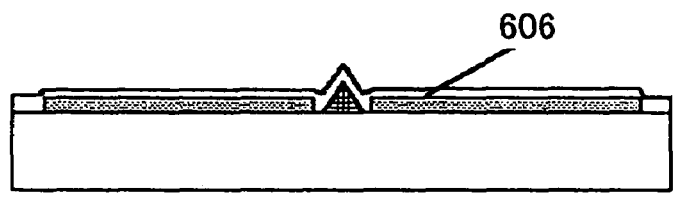

In FIG. 9C, the insulating film (protective film) 606 covering the electrodes 605a and 605b is formed by forming a silicon oxide film through a plasma CVD process.

Figure 9D:
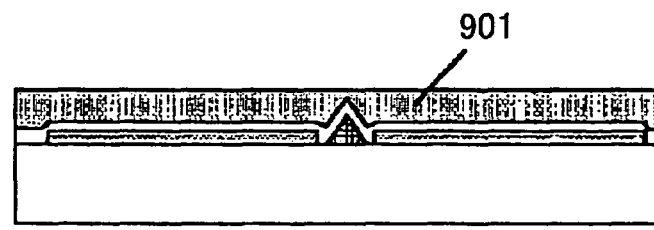

In FIG. 9D, an amorphous silicon film is deposited through sputtering, and the deposited film is planarized by process time control using CMP technology. Herein, the film thickness of the amorphous silicon film over the peak portion of the fulcrum member 603 is controlled. The resulting amorphous silicon film corresponds to a first sacrificial layer 901. It is noted that the first sacrificial layer 901 is not limited to the amorphous silicon film and, for example, a polyimide film, a photoconductive organic film (a resist film generally used in a semiconductor process), and a polycrystalline silicon film may also be used. As for the planarizing method, a reflow method through thermal processing, and an etch-back method through dry etching may be used.

Figure 9E:
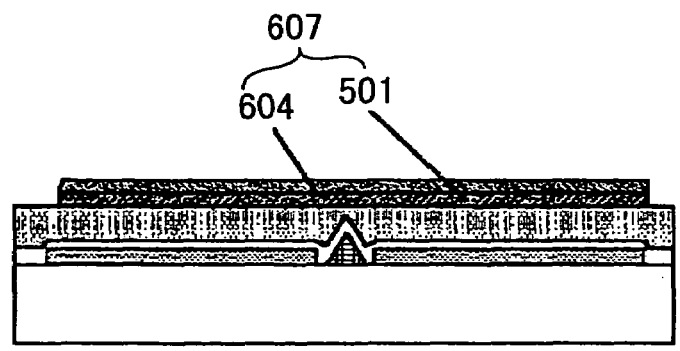

In FIG. 9E, a silicon oxide film as the material for the electret member 501 is deposited through a plasma CVD process, and is charged to a desired electric potential by implementing the charge method described above. The electret member 501 is preferably made of an inorganic material, and more preferably, a metal oxide film, a metal oxinitride film, or a metal nitride film, for example. It is noted that a silicon nitride film or an aluminum nitride film, for example, may be used instead of the above silicon oxide film as necessary or desired. Then, an aluminum group metal film as the material for the light reflection region 604 is deposited using a sputtering technique, and the light reflection region 604 and the electret member 501 are successively patterned through photomechanical processing and dry etching. The resulting light reflection region 604 and the electret member 501 correspond to the sheet member 607.

Figure 9F:
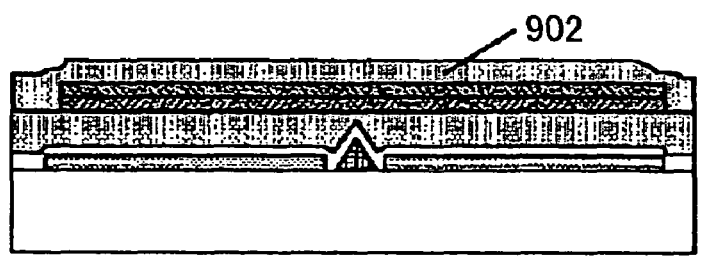

In FIG. 9F, an amorphous silicon film is deposited through sputtering to form a second sacrificial layer 902. As for the material of the second sacrificial layer 902, a polyimide film, a photoconductive organic film (resist film generally used in a semiconductor process), or a polycrystalline silicon film, for example, may be used instead of the amorphous silicon film.

Figure 9G:
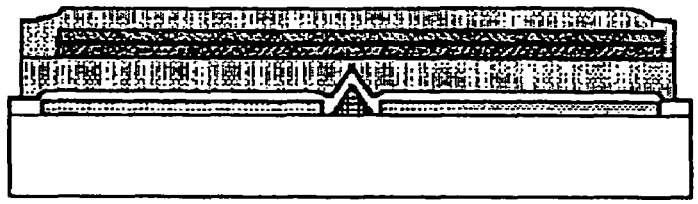

In FIG. 9G, to isolate the optical deflection apparatus, and to implement the regulating members 602 having stoppers around and/or at portions of the periphery of the sheet member 607, the first sacrificial layer 901 and the second sacrificial layer 902 are simultaneously patterned to be somewhat larger than the sheet member 607 through photomechanical processing and dry etching.

Figure 9H:
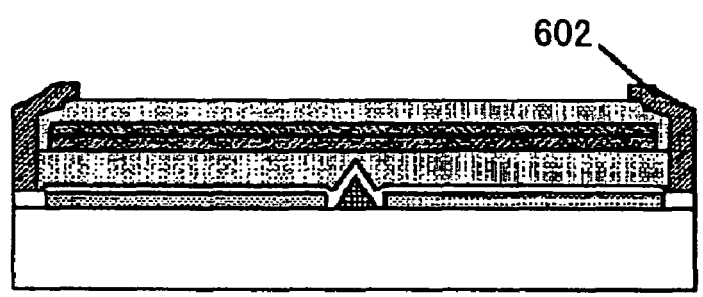

In FIG. 9H, a silicon oxide film as the material for the regulating members 602 having stoppers is deposited through a plasma CVD process, and the regulating members 602 are patterned at arbitrary locations through photomechanical processing and dry etching. It is noted that the positioning of the regulating members 602 is not limited to that indicated in FIG. 6A; rather, the regulating members 602 may be placed anywhere as long as they are able to confine the movement of the sheet member 607 to within a predetermined space.

Figure 9I:
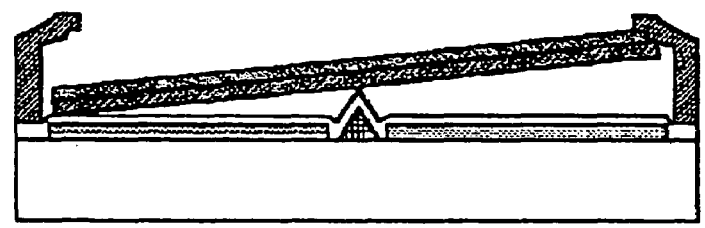

In FIG. 9I, the first sacrificial layer 901 and the second sacrificial layer 902 are etched and removed through wet etching, for example, via an opening so that the sheet member 607 is left within a space that controls its movement range. In this way, the optical deflection apparatus manufacturing process according to the present embodiment is completed. It is noted that the sacrificial layer etching is not limited to wet etching, and for example, depending on the type of sacrificial layer being used, dry etching may be implemented as well.

In the sacrificial layer etching, the etching progresses in the substrate plane direction, and thereby, the materials of the electret member 501 and the light reflection region 604 making up the sheet member 607 are arranged to be materials that are not easily etched in the etching process of the first and second sacrificial layers 901 and 902.

The electret member 501 is preferably unified with a drive IC in the semiconductor process, and thereby, a material with high thermal resistance is preferably used. Also, since the electret member 501 is disposed within a confined space in the present embodiment, the film thickness of the electret member 501 is preferably 0.5 µm or lower. Additionally, the charge potential of the electret member 501 is preferably arranged to be semi-permanently stable in accordance with the service life of the optical deflection apparatus, and the electret member 501 is preferably arranged to be in contact with a member including the light reflection region. In turn, the electret member 501 is preferably smooth in order to prevent deviation in optical deflection, and a material with low stress is preferably used.

Also, the electret member 501 is preferably made of a rigid film that may not be deformed by the electrostatic attraction force that is generated when the sheet member 607 is moved close to the electrode 605*a* or the electrode 605*b*. Additionally, the electret member 501 preferably has high etching selectivity with respect to the sacrificial layer etching (i.e., etching may not be easily realized).

Accordingly, an inorganic material is preferably used for the electret member 501 since an inorganic electret has better thermal resistance characteristics compared to an organic electret, and thereby, the electret member 501 may be made thinner when using an inorganic material. Further, by using a metal oxide film, a metal oxinitride film, or a metal nitride film as the inorganic material, good compatibility may be realized with a semiconductor process (manufacturing process of a semiconductor apparatus such as an IC), and thereby, an electret member 501 capable of high voltage charge may be realized.

Particularly, by using a silicon oxide film as the inorganic material, the electret member 501, as a component of the sheet member 607 that is displaced or deformed in an optical deflection operation, may be arranged to be a relatively low-stress component. Also, good etching selectivity may be achieved with respect to the sacrificial layers in a dry etching process, and an optical deflection apparatus with good manufacturing processing yield may be realized.

By using a silicon nitride film as the inorganic material, the electret member 501, as a component of the sheet member 607 that is displaced or deformed in an optical deflection operation, may be arranged to be a rigid component. Also, good etching selectivity with respect to the sacrificial layers may be realized in a wet etching process, and an optical deflection apparatus with good manufacturing processing yield may be realized.

By using an aluminum nitride film as the inorganic material, the electret member 501, as a component of the sheet member 607 that is displaced or deformed in an optical deflection operation, may be arranged to be a rigid component. Also, good etching selectivity with respect to the sacrificial layers may be realized in a wet etching process or a dry etching process, and an optical deflection apparatus with good manufacturing processing yield may be realized.

(Embodiment 6)

Figure 10A:
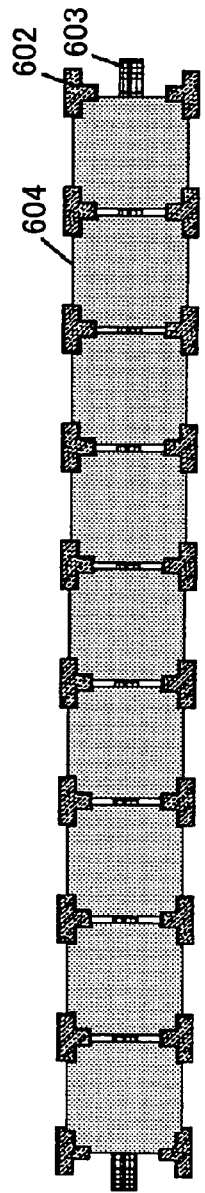
FIGS. 10A and 10B show configurations of optical deflection arrays according to a sixth embodiment of the present invention.
Figure 10B:
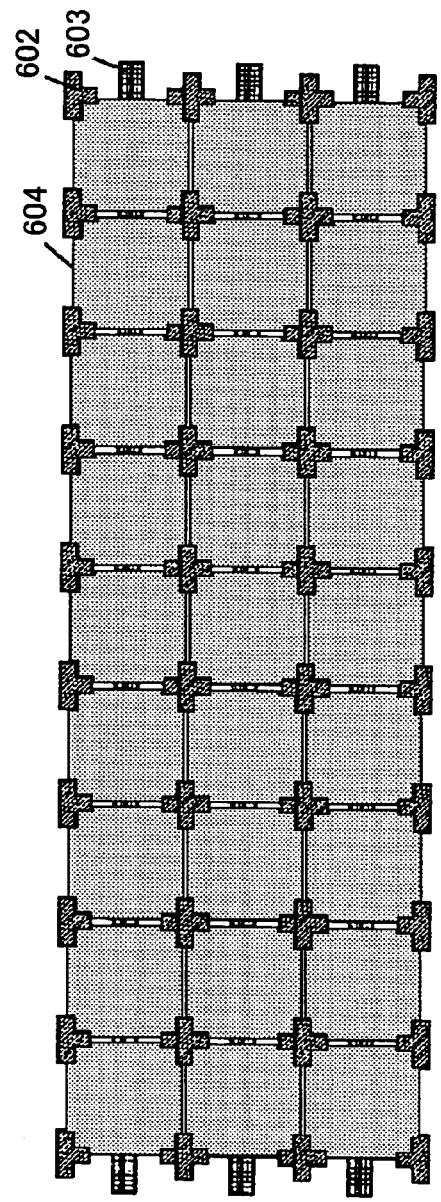

FIGS. 10A and 10B show configurations of optical deflection arrays according to a sixth embodiment of the present invention. FIG. 10A is a top view of a one-dimensional optical deflection array of the present embodiment in which a plural number of the optical deflection apparatuses of the fourth embodiment as illustrated in FIGS. 6A and 6B are aligned into one line in a direction perpendicular to an optical deflection plane direction. FIG. 10B is a top view of a two-dimensional optical deflection array according to the present invention in which a plural number of the optical deflection apparatuses of the fourth embodiment as illustrated in FIGS. 6A and 6B are aligned into plural lines in a direction perpendicular to the optical deflection plane direction.

By implementing a plural number of the optical deflection apparatuses in a one-dimensional or two-dimensional arrangement to form the optical deflection array, the number of electrodes may be reduced, and a highly integrated optical deflection array may be realized at a low cost.

(Embodiment 7)

Figure 11:
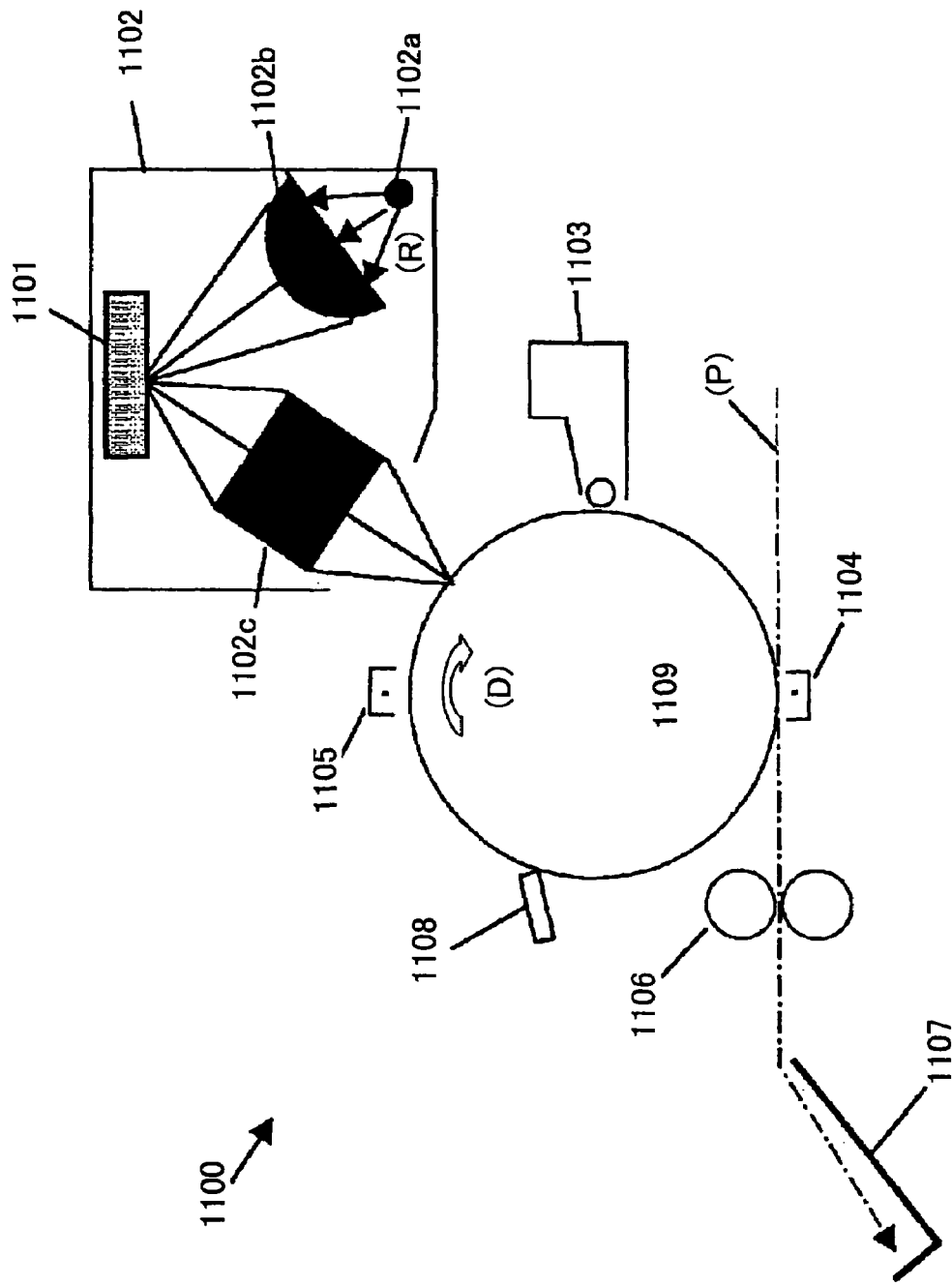
FIG. 11 is a diagram showing a configuration of an imaging apparatus according to a seventh embodiment of the present invention.

FIG. 11 shows a configuration of an imaging apparatus 1100 according to a seventh embodiment of the present invention. The imaging apparatus 1100 according to the seventh embodiment implements an optical deflection array 1101 according to the sixth embodiment in an optical write unit 1102 for forming a latent image.

The imaging apparatus 1100 forms an image through optical writing in an electrophotographic process. The imaging apparatus 1100 includes a drum-shaped image carrier 1109 implementing a photoconductor that carries a formed image and is arranged to be able to rotate in a direction indicated by arrow (D) in the drawing. The photoconductor of the image carrier 1109 is evenly charged by a charge unit 1105, and a latent image is formed thereon through optical writing that is conducted by the optical write unit 1102 implementing the optical array 1101. Then, the latent image is developed by a developing unit 1103, and a toner image is formed on the photoconductor. The toner image is then transferred to a transfer medium (P) by a transfer unit 1104 and fixed by a fixing unit 1106, after which the transfer medium (P) is delivered to a paper delivery tray 1107. Also, after transferring the toner image on the transfer medium (P) by means of the transfer unit 1104, the photoconductor of the image carrier 1109 is cleaned by a cleaning unit 1108 so as to be prepared for a next imaging process.

The optical write unit 1102 includes a light source 1102*a*, a first lens system 1102*b*, a second lens system 1102*c*, and the optical deflection array 1101. In the optical write unit 1102, an incident light flux (R) from the light source 1102*a* is irradiated on the optical deflection array 1101 via the first lens system 1102*b*. Each of the optical deflection apparatuses implemented in the optical deflection array 1101 tilts according to the image information to change the reflection direction of the incident light flux (R). The incident light flux (R) then passes through the second lens system 1102*c* and is irradiated on the photoconductor surface of the image carrier 1109 to form a latent image.

By implementing the optical deflection array according to an embodiment of the present invention as an optical write unit of an imaging apparatus, a small and highly integrated optical write unit may be realized at a low cost, and thereby, a small and low-priced imaging apparatus may be realize.

(Embodiment 8)

Figure 12:
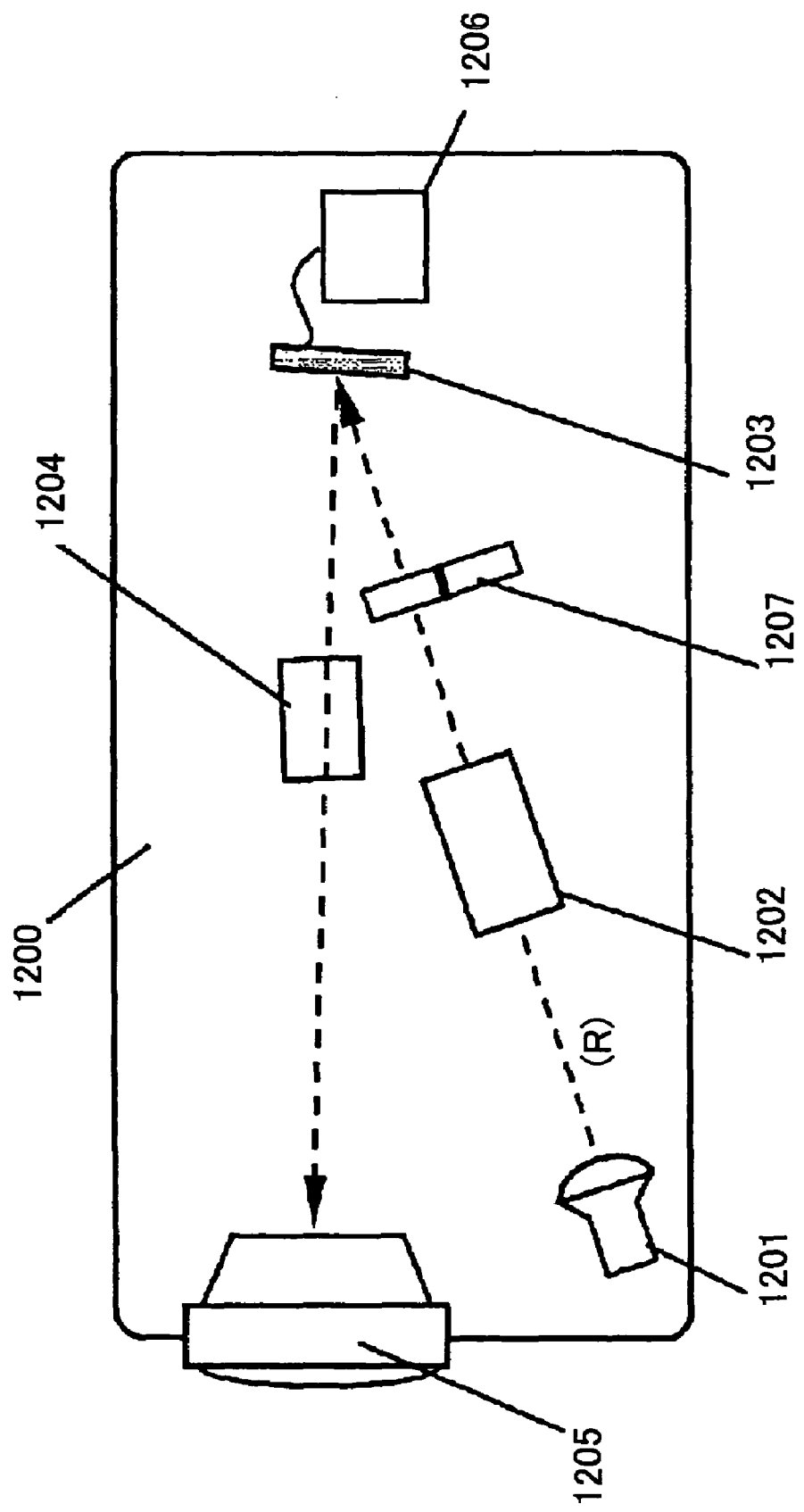
FIG. 12 is a diagram showing a configuration of an image projection display apparatus according to an eighth embodiment of the present invention.

FIG. 12 shows a configuration of an image projection apparatus 1200 according to an eighth embodiment of the present invention. The image projection apparatus 1200 implements the optical deflection array of the sixth embodiment as a display unit 1203 that reflects a light flux (R) from a light source 1201 in a desired direction according to the image information.

The light source 1201 may be any suitable light source that is preferably cheaper than a laser light source such as a white light source, for example. The image projection apparatus 1200 of FIG. 12 also includes a lighting optical system 1202, projection optical systems 1204 and 1205, and a control system 1206. The lighting optical system 1202 guides the light flux (R) from the light source 1201 to the optical deflection array 1203. The projection optical systems 1204 and 1205 are adapted to magnify and project the light flux (R) deflected in the desired direction by the optical deflection array 1203 that implements optical deflection apparatuses in a two-dimensional arrangement according to the pixel alignment in the vertical direction and the pixel alignment in the horizontal direction of the display screen. The control system 1206 is realized by an electronic circuit, and is adapted to control the operation of the optical deflection array 1203. It is noted that the dashed arrows in this drawing indicate a portion of the light flux (R). The light flux generated from the light source 1201 is guided to the optical deflection array 1203 by the lighting optical system 1202, and is deflected at the optical deflection array 1203. The deflected light flux is then projected as a two-dimensional image by the projection optical systems 1204 and 1205. In the image projection apparatus of FIG. 12, a rotating color wheel 1207 that is used for selecting a waveform of the incident light flux being guided to the optical deflection array 1203 is further implemented. According to the present embodiment, the image projection apparatus 1200 implements the optical deflection array of the sixth embodiment as the display unit, and thereby, a small and highly integrated display unit may be realized at a low cost, and in turn, a miniaturized and low-priced image projection apparatus may be realized.

As can be appreciated from the above descriptions, in the embodiments of the present invention, the number of electrodes for driving one optical deflection apparatus may be reduced, and the drive system may be simplified so that the cost for manufacturing an external drive circuit or an integrated drive circuit (IC) may be reduced. Also, since the drive system may be simplified, the area occupied by the drive IC implemented under the optical deflection apparatus may be reduced, and miniaturization and high integration of the optical deflection apparatus may be realized.

Further, the present invention is not limited to these embodiments, and variations and modifications may be made without departing from the scope of the present invention.

The present application is based on and claims the benefit of the earlier filing date of Japanese Patent Application No.2003-110644 filed on Apr. 15, 2003, the entire contents of which are hereby incorporated by reference.

What is claimed is:

1. An optical deflection apparatus that changes a reflection direction of an incident light flux, the optical deflection apparatus comprising:
 a member including a light reflection region; and
 an electret member that contributes at least in part to a generation of an electrostatic attraction force, the electrostatic attraction force subjecting the member including the light reflection region to at least one of a displacement and a deformation,
 wherein the member including the light reflection region has a torsion beam configuration.

2. An optical deflection apparatus that changes a reflection direction of an incident light flux, the optical deflection apparatus comprising:
 a member including a light reflection region; and
 an electret member that contributes at least in part to a generation of an electrostatic attraction force, the electrostatic attraction force subjecting the member including the light reflection region to at least one of a displacement and a deformation,
 wherein the member including the light reflection region has a dual side fixed beam configuration.

3. An optical deflection apparatus that changes a reflection direction of an incident light flux, the optical deflection apparatus comprising:
 a substrate;
 a plurality of regulating members having stoppers and being implemented at a plurality of edge portions of the substrate;
 a fulcrum member being implemented on the substrate;
 a sheet member including a light reflection region and an electret member, and being movably disposed within a space created by the substrate, the fulcrum member, and the stoppers; and
 a plurality of electrodes being implemented on the substrate and arranged substantially opposite to the sheet member;
 wherein the sheet member is subjected to at least one of a displacement and a deformation by an electrostatic force generated with respect to the electret member and the electrodes.

4. The optical deflection apparatus as claimed in claim 3, wherein:
 the fulcrum member is arranged to divide the substrate substantially in half;
 the electrodes are arranged such that a first electrode is implemented on one side of the fulcrum member and a second electrode is implemented on the other side of the fulcrum member; and
 a one-axis two-dimensional optical deflection is realized by tilting the sheet member around the fulcrum member.

5. The optical deflection apparatus as claimed in claim 4, wherein:
 a first electric potential that is substantially equivalent to an electric potential of the electret member is applied to one of the first and second electrodes;
 a second electric potential is applied to the other one of the first and second electrodes; and
 the sheet member is tilted by switching between applying the first electric potential and the second electric potential to the first electrode and the second electrode.

6. The optical deflection apparatus as claimed in claim 5, wherein the second electric potential corresponds to a ground potential.

7. The optical deflection apparatus as claimed in claim 3, wherein an inorganic material is used for the electret member.

8. The optical deflection apparatus as claimed in claim 7, wherein at least one of a metal oxide film, a metal oxinitride film, and a metal nitride film is used as the inorganic material.

9. The optical deflection apparatus as claimed in claim 7, wherein a silicon oxide film is used as the inorganic material.

10. The optical deflection apparatus as claimed in claim 7, wherein a silicon nitride film is used as the inorganic material.

11. The optical deflection apparatus as claimed in claim 7, wherein an aluminum nitride film is used as the inorganic material.

12. An optical deflection apparatus manufacturing method, comprising the steps of:
 forming a fulcrum member on a substrate;
 forming a plurality of electrodes on the substrate;
 depositing and planarizing a first sacrificial layer over the electrodes;
 depositing an electret member on the first sacrificial layer;
 charging the electret member to a predetermined electric potential;
 depositing a member including a light reflection region on the electret member;
 patterning the electret member and the member including the light reflection region to form a sheet member;
 depositing a second sacrificial layer on the sheet member;
 patterning the first sacrificial layer and the second sacrificial layer;
 patterning a plurality of regulating members having stoppers to a position where the first and second sacrificial layers are patterned; and
 removing the patterned first and second sacrificial layers through etching.

13. The optical deflection apparatus manufacturing method as claimed in claim 12, wherein an inorganic material is used for the electret member.

14. The optical deflection apparatus manufacturing method as claimed in claim 13, wherein at least one of a metal oxide film, a metal oxinitride film, and a metal nitride film is used as the inorganic material.

15. The optical deflection apparatus manufacturing method as claimed in claim 13, wherein a silicon oxide film is used as the inorganic material.

16. The optical deflection apparatus manufacturing method as claimed in claim 13, wherein a silicon nitride film is used as the inorganic material.

17. The optical deflection apparatus manufacturing method as claimed in claim 13, wherein an aluminum nitride film is used as the inorganic material.

18. An optical deflection array that is adapted to change a reflection direction of an incident light flux, the optical deflection array comprising:

an optical deflection apparatus including a member having a light reflection region, and an electret member that contributes to a generation of an electrostatic attraction force, the electrostatic attraction force subjecting the member having the light reflection region to at least one of a displacement and a deformation;

wherein a plurality of the optical deflection apparatuses are laid out in at least one of a one-dimensional arrangement and a two-dimensional arrangement, and the member including the light reflection region has a torsion beam configuration.

19. An optical deflection array that is adapted to change a reflection direction of an incident light flux, the optical deflection array comprising: an optical deflection apparatus including a substrate, a plurality of regulating members having stoppers and being implemented at a plurality of edge portions of the substrate, a fulcrum member being implemented on the substrate, a sheet member including an electret member and a light reflection region, and being movably disposed within a space created by the substrate, the fulcrum member, and the stoppers, and a plurality of electrodes being implemented on the substrate and arranged substantially opposite to the electret member, the sheet member being subjected to at least one of a displacement and a deformation by an electrostatic attraction force generated with respect to the electret member and the electrodes;

wherein a plurality of the optical deflection apparatuses are laid out in at least one of a one-dimensional arrangement and a two-dimensional arrangement.

20. An imaging apparatus that is adapted to form a latent image by conducting optical writing on a photoconductor, the imaging apparatus comprising:

an optical write unit including an optical deflection array that is adapted to change a reflection direction of an incident light flux, the optical deflection array implementing an optical deflection apparatus including a member having a light reflection region, and an electret member that contributes to a generation of an electrostatic attraction force, the electrostatic attraction force subjecting the member having the light reflection region to at least one of a displacement and a deformation, wherein a plurality of the optical deflection apparatuses are laid out in at least one of a one-dimensional arrangement and a two-dimensional arrangement.

21. An imaging apparatus that is adapted to form a latent image by conducting optical writing on a photoconductor, the imaging apparatus comprising:

an optical write unit including an optical deflection array that is adapted to change a reflection direction of an incident light flux, the optical deflection array implementing an optical deflection apparatus including a substrate, a plurality of regulating members having stoppers and being implemented at a plurality of edge portions of the substrate, a fulcrum member being implemented on the substrate, a sheet member including an electret member and a light reflection region, and being movably accommodated within a space created by the substrate, the fulcrum member, and the stoppers, and a plurality of electrodes being implemented on the substrate, and arranged substantially opposite to the electret member, the sheet member being subjected to at least one of a displacement and a deformation by an electrostatic force that is generated with respect to the electret member and the electrodes, wherein a plurality of the optical deflection apparatuses are laid out in at least one of a one-dimensional arrangement and a two-dimensional arrangement.

22. An image projection display apparatus that is adapted to display a projection image based on image information, the image projection apparatus comprising:

a display unit that reflects an optical signal from a light source in a desired direction according to the image information, the display unit including an optical deflection array that implements an optical deflection apparatus including a member having a light reflection region, and an electret member that contributes to a generation of an electrostatic attraction force, the electrostatic attraction force subjecting the member having the light reflection region to at least one of a displacement and a deformation, wherein a plurality of the optical deflection apparatuses are laid out in at least one of a one-dimensional arrangement and a two-dimensional arrangement.

23. An image projection display apparatus that is adapted to display a projection image based on image information, the image projection apparatus comprising:

a display unit that reflects an optical signal from a light source in a desired direction according to the image information, the display unit including an optical deflection array that implements an optical deflection apparatus including a substrate, a plurality of regulating members having stoppers and being implemented at a plurality of edge portions of the substrate, a fulcrum member being implemented on the substrate, a sheet member including an electret member and a light reflection region, and being movably accommodated within a space created by the substrate, the fulcrum member, and the stoppers, and a plurality of electrodes being implemented on the substrate, and arranged substantially opposite to the electret member, the sheet member being subjected to at least one of a displacement and a deformation by an electrostatic force that is generated with respect to the electret member and the electrodes, wherein a plurality of the optical deflection apparatuses are laid out in at least one of a one-dimensional arrangement and a two-dimensional arrangement.

24. An optical deflection array that is adapted to change a reflection direction of an incident light flux, the optical deflection array comprising:

an optical deflection apparatus including a member having a light reflection region, and an electret member that contributes to a generation of an electrostatic attraction force, the electrostatic attraction force subjecting the member having the light reflection region to at least one of a displacement and a deformation;

wherein a plurality of the optical deflection apparatuses are laid out in at least one of a one-dimensional arrangement and a two-dimensional arrangement, and the member including the light reflection region has a dual side fixed beam configuration.

* * * * *